United States Patent
Ito et al.

(10) Patent No.: US 7,164,689 B2
(45) Date of Patent: Jan. 16, 2007

(54) MULTI-INITIATOR CONTROL UNIT AND METHOD

(75) Inventors: Hirotaka Ito, Osaka (JP); Yoshihiro Tabira, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 905 days.

(21) Appl. No.: 09/998,693

(22) Filed: Dec. 3, 2001

(65) Prior Publication Data

US 2002/0067697 A1  Jun. 6, 2002

(30) Foreign Application Priority Data

Dec. 5, 2000   (JP)   ............... 2000-370375

(51) Int. Cl.
*H04L 12/28* (2006.01)
(52) U.S. Cl. .................... 370/416; 370/423
(58) Field of Classification Search ........ 370/229–230, 370/351, 389, 392–394, 400, 412–418, 422–423, 370/474
See application file for complete search history.

(56) References Cited

U.S. PATENT DOCUMENTS

| | | | | |
|---|---|---|---|---|
| 5,781,803 A * | 7/1998 | Krakirian | ................ | 710/74 |
| 5,954,806 A * | 9/1999 | Ellis et al. | ............... | 710/62 |
| 6,012,116 A * | 1/2000 | Aybay et al. | ............... | 710/113 |
| 6,112,278 A * | 8/2000 | Ellis et al. | ............... | 711/118 |
| 6,138,161 A * | 10/2000 | Reynolds et al. | ......... | 709/227 |
| 6,205,494 B1 * | 3/2001 | Williams | ................ | 710/5 |
| 6,247,040 B1 * | 6/2001 | Born et al. | .............. | 718/103 |
| 6,430,645 B1 * | 8/2002 | Basham | ................... | 710/305 |
| 6,457,079 B1 | 9/2002 | Hanaoka et al. | | |
| 6,529,989 B1 * | 3/2003 | Bashford et al. | ......... | 710/306 |
| 2004/0170432 A1 * | 9/2004 | Reynolds et al. | ......... | 398/49 |
| 2005/0273622 A1 * | 12/2005 | Nagasaka | ................ | 713/182 |

FOREIGN PATENT DOCUMENTS

| | | |
|---|---|---|
| JP | 5-134810 | 6/1993 |
| JP | 2000-250846 A | 9/2000 |
| JP | 2000-253024 A | 9/2000 |

\* cited by examiner

*Primary Examiner*—Huy D. Vu
*Assistant Examiner*—Jason Mattis
(74) *Attorney, Agent, or Firm*—McDermott Will & Emery LLP

(57) ABSTRACT

The multi-initiator control unit for performing packet-unit communication with each of a plurality of devices connected via a transmission line includes: a packet filter for analyzing a received packet and outputting the results; a plurality of command control circuits each for controlling a command processing sequence performed with the corresponding device; a multi-control circuit for giving sequence execution permission to one of the plurality of command control circuits; and a packet processing circuit for generating a packet containing information output by the permission-given command control circuit and outputting the packet for transmission, and also outputting a received packet according to the analysis results output by the packet filter.

2 Claims, 13 Drawing Sheets

INTERNAL BWRQ PACKET
(Block write request transmit format)

INTERNAL QWRQ PACKET
(Quadlet write request transmit format)

INTERNAL WRS PACKET
(Write response receive format)

INTERNAL BRRQ PACKET
(Block read request transmit format)

INTERNAL BRRS PACKET
(Block read response receive format)

BWRQ PACKET
(Write request for data block packet format)

QWRQ PACKET
(Write request for data quadlet packet format)

WRS PACKET
(Write response packet format)

BRRQ PACKET
(Read request for data block packet format)

BRRS PACKET
(Read response for data block packet format)

MULTI-INITIATOR CONTROL UNIT AND METHOD

BACKGROUND OF THE INVENTION

The present invention relates to sequence processing technology in relation to a protocol used when a command or data is transmitted between a computer and a peripheral device via a transmission line.

The IEEE 1394 system has received attention as a next-generation interface for connection between audio-visual (AV) appliances, computers, and the like because the IEEE 1394 system defines both asynchronous communications and isochronous communications. Asynchronous communications is adopted for communication requiring reliability more than real-time capability, such as data transmission between a computer and a recording medium. Isochronous communications is adopted for communication requiring real-time capability rather than reliability, such as transmission of AV data including moving images. Therefore, for storing computer data in a DVD-RAM (digital versatile disc—random access memory) drive or reading computer data stored in a DVD-RAM drive, for example, according to IEEE 1394, data transmission is generally performed by asynchronous communications.

Serial bus protocol-2 (SBP-2) is a protocol for IEEE 1394 asynchronous communications between a device such as a computer (an initiator) and a peripheral device (a target). Hereinafter, a command processing sequence followed when a computer reads data from a target such as a DVD-RAM drive according to SBP-2 will be described.

SBP-2 commands may be grouped into command-type commands such as READ and WRITE and management-type (task management-type) commands such as LOGIN, QUERY LOGIN, ABORT TASK, and ABORT TASK SET.

FIG. 9 is a diagram illustrating a command processing sequence for executing LOGIN command as a management-type command. Referring to FIG. 9, a command processing sequence for LOGIN command will be described.

(1) An initiator issues a quadlet read request (QRRQ) packet to acquire unique information (such as device information) of a target. In general, the unique information is entirely stored in an area called a configuration ROM (configROM), and contains the address of a MANAGEMENT_AGENT register of the target.

(2) In response to the QRRQ packet from the initiator, the target returns configROM data to the initiator as a quadlet read response (QRRS) packet. The process steps (1) and (2) of transmitting the QRRQ and QRRS packets continue until the initiator acquires all of configROM data.

(3) The initiator issues a block write request (BWRQ) packet, writing the address of a memory storing an operation request block (ORB) in the MANAGEMENT_AGENT register. The ORB is prepared in advance by the initiator. The MANAGEMENT_AGENT register exists in a control and status register (CSR) space of the target.

(4) In response to the BWRQ packet from the initiator, the target returns a write response (WRS) packet to the initiator.

(5) The target issues a block read request (BRRQ) packet to the initiator, requesting transmission of the ORB to the target. The ORB is located at a position specified by the address stored in the MANAGEMENT_AGENT register.

(6) In response to the BRRQ packet from the target, the initiator returns a block read response (BRRS) packet to the target. The ORB is stored in a data field of the BRRS packet. In this way, the ORB is transmitted from the initiator to the target.

(7) The target receives the ORB from the initiator and analyzes the content of the received ORB.

(8) Once finding out that the received ORB represents LOGIN command, the target executes the LOGIN command. LOGIN response during the execution of the command contains the base address of a COMMAND_AGENT register.

(9) Once the execution of the LOGIN command is terminated, the target prepares status information indicating the execution results of the LOGIN command.

(10) The target issues a BWRQ packet, transmitting the status information to the initiator. The status information is stored in a predetermined address designated by the ORB (Status_FIFO address in the initiator).

(11) In response to the BWRQ packet from the target, the initiator returns a WRS packet to the target.

(12) The target determines whether or not rCode in the WRS packet from the initiator is resp_complete. If the rCode in the WRS packet from the initiator is resp_complete, the command processing sequence for the LOGIN command is completed.

FIG. 10 is a diagram illustrating a command processing sequence for executing READ command as a command-type command. The sequence of FIG. 10 is executed after the termination of the LOGIN command processing sequence described with reference to FIG. 9. Referring to FIG. 10, the command processing sequence for READ command will be described.

(21) The initiator prepares an ORB representing READ command, which defines information required for execution of the READ command, such as the data amount, the maximum packet length, the transfer direction, and the transfer method.

(22) The initiator writes a QWRQ packet in an AGENT_RESET register of the target to initialize the target. The AGENT_RESET register exists in the CSR space of the target.

(23) In response to the QWRQ packet from the initiator, the target returns a WRS packet to the initiator.

(24) The initiator issues a BWRQ packet, writing the address in a memory storing the ORB in an ORB_POINTER register. The ORB_POINTER register exists in the CSR space of the target.

(25) In response to the BWRQ packet from the initiator, the target returns a WRS to the initiator.

(26) The target issues a BRRQ packet to the initiator, requesting transmission of the ORB to the target. The ORB is located at a position specified by the address stored in the ORB_POINTER register, that is, at the address in the memory of the initiator.

(27) In response to the BRRQ packet from the target, the initiator returns a BRRS packet to the target. The ORB is stored in a data field of the BRRS packet. In this way, the ORB is transmitted from the initiator to the target.

(28) The target receives the ORB from the initiator and analyzes the content of the received ORB.

(29) Once finding out that the received ORB represents READ command, the target executes the READ command. During the execution of the READ command, the following process steps (30) and (31) are repeated. This is because when the size of data to be transferred is large, the data must be transferred in the form of a plurality of packets. The data to be transferred is prepared by the target.

(30) The target issues a BWRQ packet, transmitting the data to an address designated by the ORB.

(31) In response to the BWRQ packet from the target, the initiator returns a WRS packet to the target. The process steps (30) and (31) constitute one transaction. After it is confirmed that one transaction has been normally terminated, the next transaction is executed.

(32) Once the data transfer sequence is normally terminated, the target prepares status information indicating the execution results of the READ command.

(33) The target issues a BWRQ packet, transmitting the status information to the initiator. The status information is stored in a predetermined address designated by the ORB.

(34) In response to the BWRQ packet from the target, the initiator returns a WRS packet to the target.

(35) The target determines whether or not rCode in the WRS packet from the initiator is resp_complete. If the rCode in the WRS packet from the initiator is resp_complete, the command processing sequence for the READ command is completed.

Note that although not illustrated in FIGS. 9 and 10, the target returns an acknowledge (ACK) packet to the initiator whenever it receives a packet from the initiator, and the initiator returns an ACK packet to the target whenever it receives a packet from the target.

When receipt of a write request packet (for example, BWRQ, QWRQ) is successful, the initiator or the target returns an ACK packet having a code of "Ack_complete" indicating success of receipt of the packet. In this case, no WRS packet is returned and the process proceeds to the next step. When the initiator or the target returns an ACK packet having a code of "Ack-pending", it returns a WRS packet. When the initiator and the target are in a state of being unable to receive a packet for any reason, they return an ACK packet having a code of "Ack_busy" indicating the state of being unable to receive a packet. In the data transfer sequence, when the initiator returns an ACK packet having a code of "Ack_busy" to the target in response to a BWRQ packet from the target, the target re-transmits the BWRQ packet to the initiator.

In the manner described above, the data transfer processing can be performed between the initiator and the target. In SBP-2, up to 63 initiators at maximum can be connected to one target on one bus.

FIG. 11 is a block diagram of a conventional sequence processor 90 that implements SBP-2. A physical layer controller 91 has functions such as initialization, arbitration, and bias voltage control of an IEEE 1394 bus 20. An link core circuit 92 receives a packet on the bus 20 via the physical layer controller 91, and performs preparation/detection of an error detection code, addition of the error detection code to a packet, detection of a code (for example, a code in an ACK packet), and the like. The link core circuit 92 also outputs a packet to the bus 20 via the physical layer controller 91. In addition, the link core circuit 92 has a retry function of retrying transfer of a packet of which transfer has once failed.

A packet filter 93 receives the packet output by the link core circuit 92, and analyzes the content of a header field of the packet. The packet filter 93 sends a control signal to a sequence control circuit 99 or a transfer control circuit 96 depending on the analysis results, as well as outputting the received packet to a packet processing circuit 95. The packet processing circuit 95 processes the input packet and outputs a command to a command receive buffer 97 or outputs the received data externally via a direct memory access (DMA) bus 6, under control of the sequence control circuit 99 or the transfer control circuit 96. The sequence control circuit 99 performs execution and control of a command processing sequence for one connected initiator.

As described above, the conventional sequence processor of FIG. 11 performs a command processing sequence involving one initiator.

For the conventional sequence processor to perform a command processing sequence for two or more initiators, it is necessary to perform all of the sequence processing for the second and subsequent initiators and the management of the respective initiators by firmware. This greatly increases the load on a central processing unit (CPU).

In particular, when a large amount of data handled by an optical disc device such as a DVD-RAM is transferred, the load on a CPU dramatically increases. This increases the overhead of firmware executed by the CPU, and as a result, makes it quite difficult to attain a high effective transfer rate required for a high-speed serial bus interface, which should actually be attained by adopting IEEE 1394. In addition, since the load on the CPU is great when all of the above processing is performed by firmware, the sequence processor cannot be incorporated in another system such as an optical disc device.

As described above, the conventional sequence processor is actually applicable only to an occasion including a single initiator. Therefore, the conventional sequence processor is low in extensibility and is not so effectively usable in a network environment including a plurality of initiators.

SUMMARY OF THE INVENTION

An object of the present invention is providing a multi-initiator control unit capable of executing a command processing sequence for two or more devices.

According to one aspect of the invention, a multi-initiator control unit for performing packet-unit communication with each of a plurality of devices connected via a transmission line is provided. The multi-initiator control unit includes: a link core circuit for transmitting a packet to be transmitted to the transmission line, and also receiving a packet from the transmission line, performing error detection, and outputting the error-detected packet; a packet filter for analyzing the packet received by the link core circuit and outputting the results; a plurality of command control circuits each for controlling a command processing sequence performed with the corresponding device; a multi-control circuit for giving sequence execution permission to one of the plurality of command control circuits; a packet processing circuit for generating a packet containing information output by the permission-given command control circuit as the packet to be transmitted and outputting the packet to the link core circuit for transmission, and also outputting the packet received and output by the link core circuit according to the analysis results output by the packet filter; and a CPU for executing a command contained in the packet output by the packet processing circuit.

According to the invention described above, the multi-initiator control unit can transmit a packet to a device and execute a command contained in a packet transmitted by the device in response to the packet transmitted by the multi-initiator control unit. This command processing sequence is executed by the command control circuit. Therefore, the CPU is not involved in execution of the command processing sequence. Also, the multi-control circuit controls selection of a device for which the multi-initiator control unit performs the command processing sequence. This can reduce the load on the CPU.

Preferably, each of the plurality of command control circuits stores information output by the corresponding device, the information being required for a command processing sequence performed with the corresponding device, and outputs the information once the sequence execution permission is given to the command control circuit. The multi-control circuit preferably outputs information contained in the packet received and output by the link core circuit, the information being required for a command processing sequence performed with the sender device of the packet, to the command control circuit among the plurality of command control circuits corresponding to the sender device to be stored in the command control circuit, based on the output of the packet filter. And, preferably, the packet processing circuit generates a packet containing information output by the command control circuit provided with the sequence execution permission and outputs the packet, and also receives a packet output by the device corresponding to the command control circuit in response to the packet output by the packet processing circuit.

With the above construction, the plurality of command control circuits can be efficiently controlled to enable processing of a series of transactions in the command processing sequence.

In the multi-initiator control unit described above, preferably, each of the plurality of command control circuits stores information in a command fetch request packet transmitted from the corresponding device, and performs command fetch operation for the device once the sequence execution permission is given to the command control circuit by the multi-control circuit.

With the above construction, since the command control circuit holds information contained in a command fetch request packet transmitted by the corresponding device, it can start command fetch operation upon receipt of the sequence execution permission. This enables efficient and high-speed operation.

Each of the plurality of command control circuits preferably receives a command fetch request from the corresponding device even during execution of a data transfer processing sequence.

With the above construction, even when command execution for one device is underway, a command fetch request for another device can be processed. Therefore, it is possible to respond to access from the corresponding device irrespective of the state of command processing.

In the multi-initiator control unit described above, preferably, each of the plurality of command control circuits has a register for storing an address for performing a command processing sequence, and an address of the register is obtained by performing address expansion on an address of the register of a reference command control circuit among the plurality of command control circuits by a predetermined value as a unit depending on the node number of the device corresponding to the command control circuit including the register in question.

With the above construction, the address of a register is determined by performing address expansion on the address of a register of the reference command control circuit. Therefore, the CPU is not required to manage the address of a register accessed by the corresponding device even when a plurality of devices are connected. This reduces the load of the CPU, and thus high-speed operation is possible as in the case of connection of a single device.

In the multi-initiator control unit described above, preferably, the multi-control circuit selects one of the plurality of devices in a predetermined order every time a command processing sequence is terminated and gives the sequence execution permission to the command control circuit among the plurality of command control circuit corresponding to the selected device.

With the above construction, whether or not command execution permission should be given is determined for the respective connected devices sequentially. This reduces variation in command execution frequency with the devices, and avoids an occurrence of more chances of executing a command being unequally given to a certain device or devices than to the other devices.

The multi-initiator control unit described above may further includes a transfer control circuit for controlling data transfer between the packet processing circuit and the outside of the multi-initiator control unit, wherein the packet processing circuit retrieves data to be transferred from the packet output by the packet filter and outputs the data to the transfer control circuit, and also generates a packet containing data transferred to the transfer control circuit and outputs the packet to the link core circuit.

With the above construction, the data transfer processing sequence is controlled by the transfer control circuit. Therefore, the CPU is not involved in execution of the data transfer sequence. This reduces the load on the CPU during execution of the data transfer processing sequence, and high-speed data transfer is possible.

In the multi-initiator control unit described above, the CPU is preferably allowed to give sequence execution permission to the plurality of command control circuits.

With the above construction, the CPU can control the command fetch operation timing. This provides an increased degree of freedom for sequence control from firmware, and enables sequence processing in synchronization with the specification of the firmware.

In the multi-initiator control unit described above, preferably, correspondence is established between the node number of each of the plurality of devices and the position of a bit in a field for identification of the node number, so that each of the devices can be identified by the position of the bit in the field.

With the above construction, the node number of each device is represented simply by one bit. This enables management of devices by a small-scale circuit even when a larger number of devices are connected.

According to another aspect of the invention, a multi-initiator control method for performing packet-unit communication with each of a plurality of devices connected via a transmission line is provided. The method includes the steps of: determining whether or not receipt of a command fetch request from one of the plurality of devices is stored; and fetching a command from the device and executing the command when it is determined that receipt of a command fetch request is stored, wherein one of the plurality of devices is selected in a predetermined order, this selection being repeated, and the step of determining and the step of fetching are performed for the selected device.

According to the invention described above, whether or not command execution permission should be given is determined for the respective connected devices sequentially. This avoids an occurrence of more chances of executing a command being unequally given to a certain device or devices than to the other devices.

DESCRIPTION OF THE PREFERRED EMBODIMENTS

Hereinafter, a preferred embodiment of the present invention will be described with reference to the accompanying drawings. It should be noted that the technical range of the present invention is not limited to the embodiment described herein.

Figure 1:
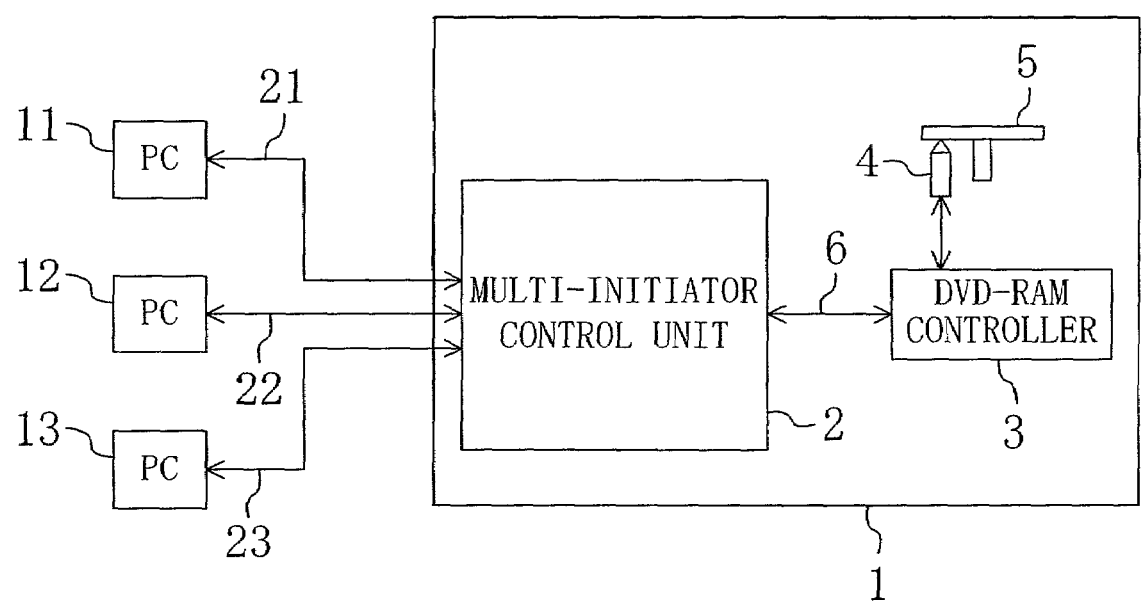
FIG. 1 is a block diagram of a data transfer system using a multi-initiator control unit of an embodiment of the present invention.

FIG. 1 is a block diagram of a data transfer system using a multi-initiator control unit of the embodiment of the present invention. The data transfer system of FIG. 1 includes an optical disc drive 1 and initiators 11, 12, and 13 as devices connected to the optical disc drive 1. The initiators 11 to 13 are personal computers (PCs), for example. The optical disc drive 1 includes a multi-initiator control unit 2 as the target, a DVD-RAM controller 3, a head 4, and a DVD-RAM disc 5.

The initiators 11, 12, and 13 are connected to the multi-initiator control unit 2 via IEEE 1394 serial buses (hereinafter, simply called "buses") 21, 22, and 23, respectively. The multi-initiator control unit 2 is connected to the DVD-RAM controller 3 via a DMA bus 6. The DVD-RAM controller 3 performs signal processing such as demodulation for data read from the DVD-RAM disc 5 via the head 4 and transfers the processed signal to the multi-initiator control unit 2. The DVD-RAM controller 3 also performs signal processing such as modulation for data transferred from the multi-initiator control unit 2 and writes the processed data in the DVD-RAM disc 5 via the head 4.

Figure 2:
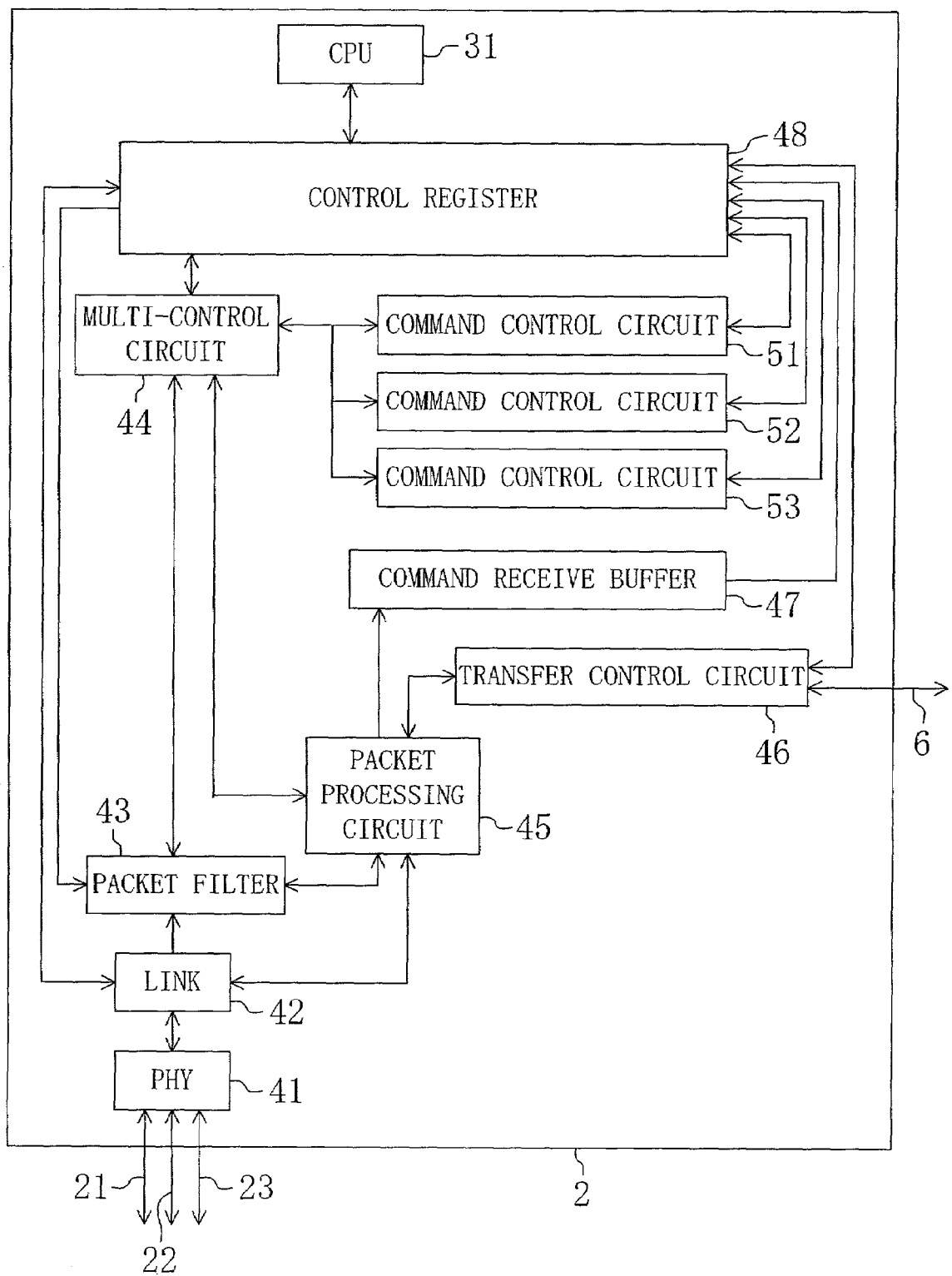
FIG. 2 is a block diagram of the multi-initiator control unit of the embodiment of the present invention shown in FIG. 1.

FIG. 2 is a block diagram of the multi-initiator control unit 2 of this embodiment shown in FIG. 1. Referring to FIG. 2, the multi-initiator control unit 2 includes a CPU 31, a physical layer controller (PHY) 41, a link core circuit (LINK) 42, a packet filter 43, a multi-control circuit 44, a packet processing circuit 45, a transfer control circuit 46, a command receive buffer 47, a control register 48, and command control circuits 51, 52, and 53.

As shown in FIG. 2, the CPU 31, the link core circuit 42, the transfer control circuit 46, and the command control circuits 51 to 53 are allowed to write/read data in/from the control register 48. The packet filter 43 can read data from the control register 48. Hereinafter, as an example, data transfer between the initiators and the target according to serial bus protocol-2 (SBP-2) will be described.

The physical layer controller 41 has functions such as initialization of the buses 21 to 23, arbitration, and control of a bias voltage. The physical layer controller 41 converts an electric signal on any of the buses 21 to 23 to a packet and outputs the packet to the link core circuit 42, and also converts a packet received from the link core circuit 42 to an electric signal and outputs the electric signal to any of the buses 21 to 23.

The link core circuit 42 receives the packet from the physical layer controller 41. The link core circuit 42 performs detection of an error detection code, detection of a code (for example, a code in an ACK packet), and the like for the received packet, and outputs the packet to the packet filter 43 and the packet processing circuit 45. The link core circuit 42 also performs preparation and addition of an error detection code for a packet to be transmitted, and outputs the packet to the physical layer controller 41. In addition, the link core circuit 42 has a retry function of retrying transfer of a packet of which transfer has once failed.

The packet filter 43 receives the packet from the link core circuit 42, and analyzes the content of a header field of the packet. The packet filter 43 determines whether or not the packet should be stored in the command receive buffer 47 depending on the analysis results, and notifies the packet processing circuit 45 of the determination. The packet filter 43 also encodes the node number of the sender initiator of the received packet, and outputs the encoded number to the multi-control circuit 44 and the transfer control circuit 46 as a control signal. In addition, the packet filter 43 outputs information contained in the received packet to the multi-control circuit 44 and the transfer control circuit 46.

The multi-control circuit 44 receives the information contained in the packet received by the link core circuit 42, from the packet filter 43, and sends the information to any of the command control circuits 51 to 53 to be stored therein, depending on the control signal output by the packet filter 43. The multi-control circuit 44 also gives sequence execution permission to one of the command control circuits 51 to 53, and outputs information sent from the permission-given command control circuit to the packet processing circuit 45.

The packet processing circuit 45, which operates under control of the multi-control circuit 44, sends the packet determined to be stored in the command receive buffer 47 by the packet filter 43 to the command receive buffer 47 to be stored therein. The packet stored in the command receive buffer 47 is free to be read by the CPU 31. The packet processing circuit 45 also prepares a packet containing information received from the multi-control circuit 44, and outputs the prepared packet to the link core circuit 42 as a packet to be transmitted.

The transfer control circuit 46 receives a transfer command execution request such as READ and WRITE output by the CPU 31 via the control register 48, and controls transfer of a packet between the packet processing circuit 45 and the DVD-RAM controller 3.

For example, in the case of executing READ command, the transfer control circuit 46 reads data recorded on the DVD-RAM disc 5 via the DVD-RAM controller 3 and the DMA bus 6 based on an execution request from the CPU 31, and outputs the data to the packet processing circuit 45. The packet processing circuit 45 divides the data received from the transfer control circuit 46 to be stored in a plurality of packets, and then outputs the packets to any of the buses 21 to 23 via the link core circuit 42 and the physical layer controller 41.

In the case of executing WRITE command, the packet processing circuit 45 receives a packet from any of the buses 21 to 23 via the physical layer controller 41 and the link core circuit 42, retrieves data from the packet, and outputs the data to the transfer control circuit 46. The transfer control circuit 46 outputs the received data to the DVD-RAM controller 3 via the DMA bus 6, so that the data is recorded on the DVD-RAM disc 5. The packet generation and packet transfer described above are controlled by the transfer control circuit 46.

Thus, with the transfer control circuit 46 performing the data transfer processing sequence, the CPU 31 is not involved in execution of the data transfer processing sequence. This enables reduction of the load on the CPU 31 during the data transfer processing sequence, and thus high-speed data transfer according to IEEE 1394 is attained.

The IEEE 1394 standard defines the data length transferable per packet (maximum payload size) in association with the transfer rate. In this embodiment, the transfer rate is set at S400 (about 400 Mbit/sec), and the data length transferable per packet at this transfer rate is 2048 bytes.

Each of the command control circuits 51, 52, and 53 which correspond to the initiators 11, 12, and 13, respectively, receives a command fetch request from the corresponding initiator and controls the command processing sequence performed with the corresponding initiator. The multi-control circuit 44 manages execution of the sequence by any of the command control circuits 51 to 53. The multi-control circuit 44 and the command control circuits 51 to 53 have respective agent registers (AGENT_REGISTER) required for a command processing sequence.

Figure 3:
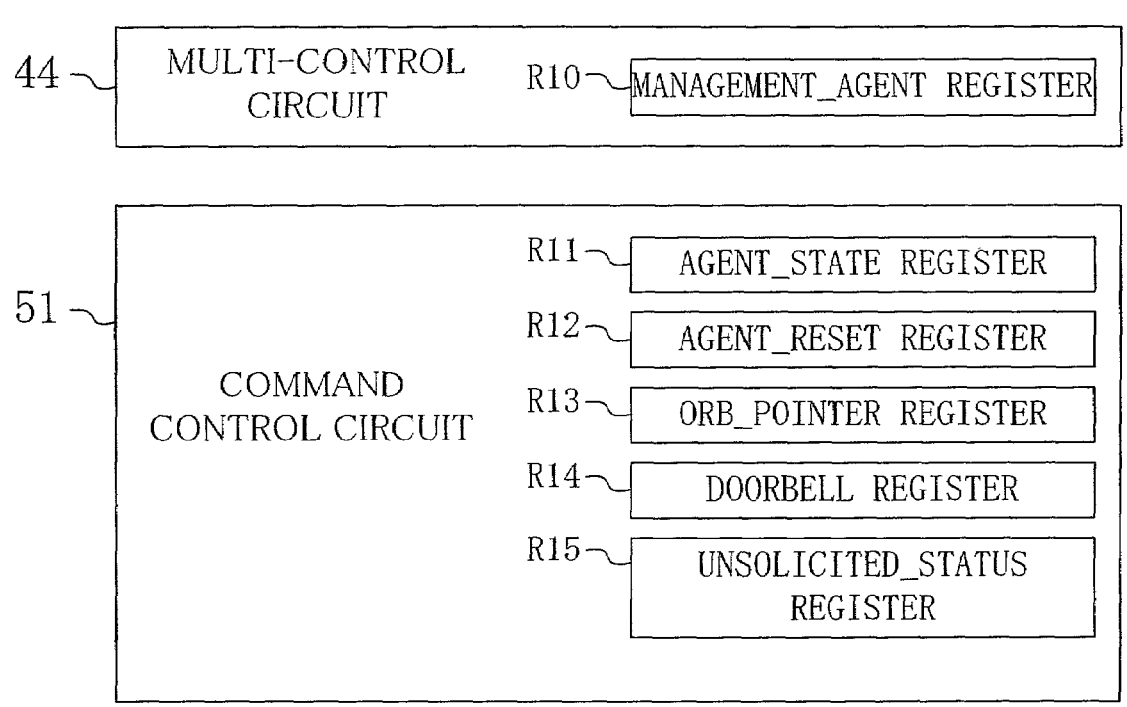
FIG. 3 is an illustration of registers of a multi-control circuit and a command control circuit shown in FIG. 2.

FIG. 3 is an illustration of registers of the multi-control circuit 44 and the command control circuit 51 shown in FIG. 2. The constructions of registers of the command control circuits 52 and 53 are the same as that of the command control circuit 51, and therefore illustration is omitted.

The multi-control circuit 44 includes a MANAGEMENT_AGENT register R10 as an agent register, which stores an address for fetching a management-type command such as LOGIN. The command control circuit 51 includes an AGENT_STATE register R11, an AGENT_RESET register R12, an ORB_POINTER register R13, a DOORBELL register R14, and an UNSOLICITED_STATUS register R15 as agent registers. The command control circuits 52 and 53 also include these registers. The registers of the command control circuits 51 to 53 store an address for fetching a command-type command and the like.

The command control circuits 51 to 53 store information required for a command processing sequence performed with the corresponding initiators 11 to 13. This information includes information in a command fetch request packet output by the corresponding initiators 11 to 13 and information indicating that there was access to the DOORBELL register.

The command control circuits 51 to 53, which receive information in a command fetch request packet from the corresponding initiators 11 to 13 and hold it therein, can queue the information in the packet for which sequence execution permission has not yet been given by the multi-control circuit 44, that is, queue a pending command. The command fetch request packet may be a BWRQ packet or a QWRQ packet, for example. If it is BWRQ packet, it contains the address to be command-fetched.

The initiators 11 to 13 may access the corresponding command control circuits 51 to 53 for command fetch request in the following two ways. One is access to the ORB POINTER register, where the address to be command-fetched (address of a position in which an operation request block (ORB) is stored) is written using a BWRQ packet, and the other is access to the DOORBELL register using a QWRQ packet. The command control circuit 51 stores the address to be command-fetched in the ORB-POINTER register R13, and, if there is access to the DOORBELL register R14, stores the fact of the access, that is, stores information indicating that there was access to the DOORBELL register R14. This is also applied to the command control circuits 52 and 53.

Figure 4:
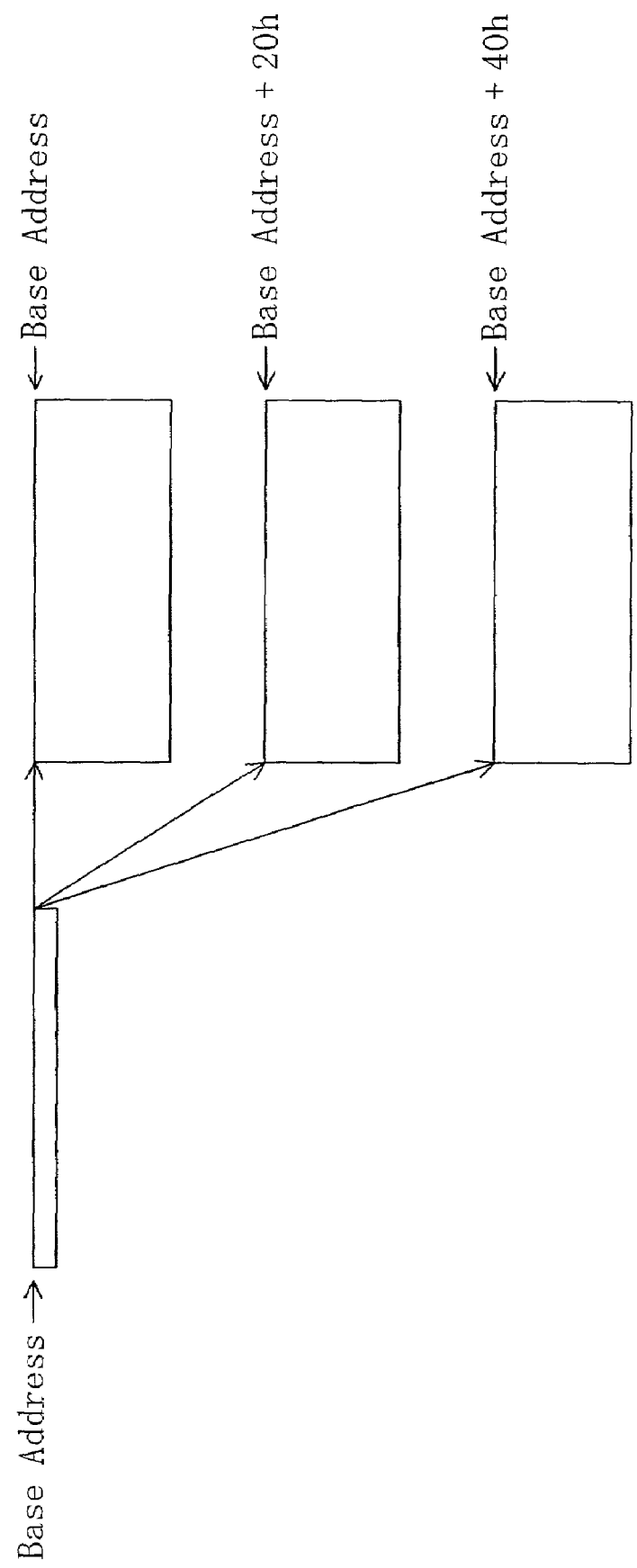
FIG. 4 is an illustration of address expansion.

FIG. 4 illustrates address expansion. The addresses of the agent registers of the command control circuit 51 are set at values obtained by adding respective predetermined values to a base address as the reference. The base address is the address of the AGENT_STATE register R11 of the command control circuit 51. The addresses of the agent registers of the command control circuit 52 are set at values obtained by adding 20h (h represents hexadecimal notation) to the same types of registers of the command control circuit 51, and the addresses of the agent registers of the command control circuit 53 are set at values obtained by adding 40h to the same types of registers of the command control circuit 51. In other words, the address regions for the command control circuits 51, 52, and 53 start from the base address, the base address+20h, and the base address+40h, respectively.

In the command processing sequence, the packet filter 43 analyzes the packet received from any of the initiators 11 to 13, compares the address which the sender initiator of the packet intends to access with the addresses of the agent registers, and notifies the multi-control circuit 44 of the comparison results.

Specifically, the packet filter 43 performs address expansion by 20h each, for example, depending on the node number of the LOGIN initiator before the analysis of the received packet, and outputs the results to the multi-control circuit 44 as a control signal. The packet filter 43 has received in advance the base address and the node numbers of the initiators 11 to 13 from the CPU 31.

When the sender of the packet is the initiator 11, the packet filter 43 does not perform address expansion, judging from the node number. In this case, the packet filter 43 compares the received address with the addresses of the agent registers determined from the base address, generates a control signal indicating the register to be accessed, and outputs the control signal to the multi-control circuit 44. When the sender of the packet is the initiator 12, the packet filter 43 compares the received address with the addresses of the agent registers determined from the address obtained by adding 20h to the base address of the initiator 11, judging from the node number, generates a control signal indicating the register to be accessed, and outputs the control signal to the multi-control circuit 44. When the sender of the packet is the initiator 13, the packet filter 43 compares the received address with the addresses of the agent registers determined from the address obtained by adding 40h to the base address of the initiator 11, judging from the node number, generates a control signal indicating the register to be accessed, and outputs the control signal to the multi-control circuit 44.

The multi-control circuit 44 accesses the register among the registers of the command control circuits 51 to 53 indicated by the control signal output by the packet filter 43, and makes the register store information in the command fetch request packet as required.

By the above management of the addresses of the agent registers, address management by the CPU 31 is simplified.

The address is determined based on the node number of the initiator as the sender of the received packet. This eliminates the necessity of increasing the circuit scale for address management of agent registers even if as many as 63 initiators, the maximum number of nodes accessible to one local bus according to the IEEE 1394 standard, are connected to the control unit. Although the address expansion from the base address was made by 20h each in the above description, any other value may be adopted as the unit of the address expansion.

Figure 5:
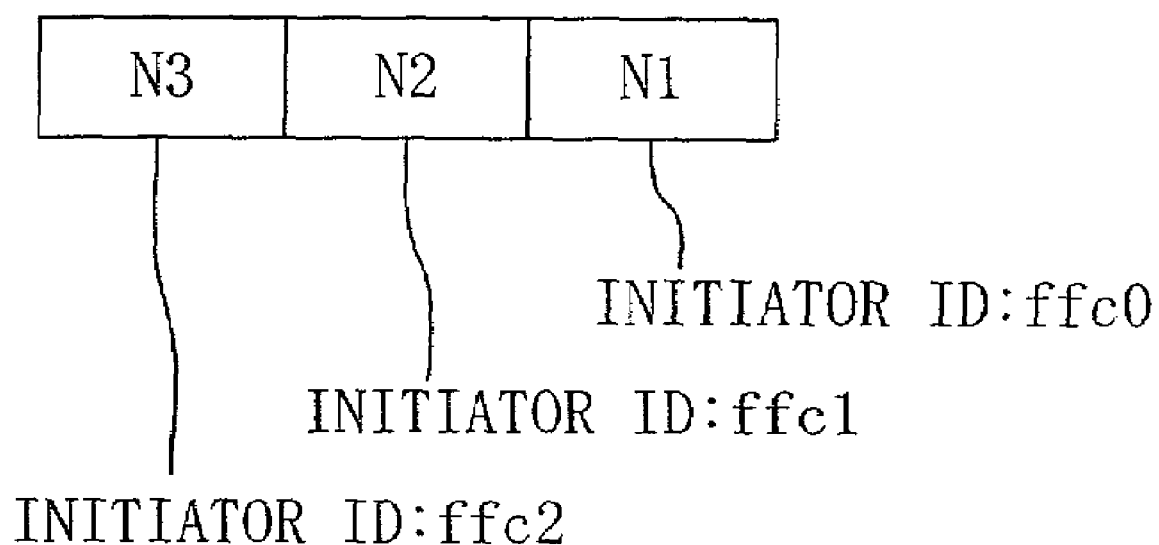
FIG. 5 is an illustration of management of node numbers of initiators.

FIG. 5 is an illustration of management of the node numbers of the initiators. In this embodiment, in which three initiators are connected to the multi-initiator control unit 2, it is assumed that these initiators are identified in a three-bit field. In other words, it is assumed that when bit N1 is "1", the initiator 11 is indicated, and likewise when bit N2 or N3 is "1", the initiator 12 or 13 is indicated.

For example, assume that the node numbers of the initiators 11, 12, and 13 are ffc0h, ffc1h, and ffc2h and that the received packet has indication of the node number ffc0h. In this case, the packet filter 43 outputs "001" to the multi-control circuit 44, notifying that the packet is from the initiator 11.

The packet processing circuit 45 converts the node number identified in the three-bit field to a 16-bit node number such as ffc0h, and incorporates the 16-bit node number in a packet.

Thus, the 16-bit node number can be represented by one bit and managed in the form of one-bit number. This simplifies the circuits handling the node numbers such as the multi-control circuit 44. Note that the node numbers of the initiators 11 to 13 may correspond with any of the positions of the bits N1, N2, and N3 as long as one-to-one correspondence is established. Naturally, the node numbers may be used as they are in the multi-control circuit 44.

Figure 6:
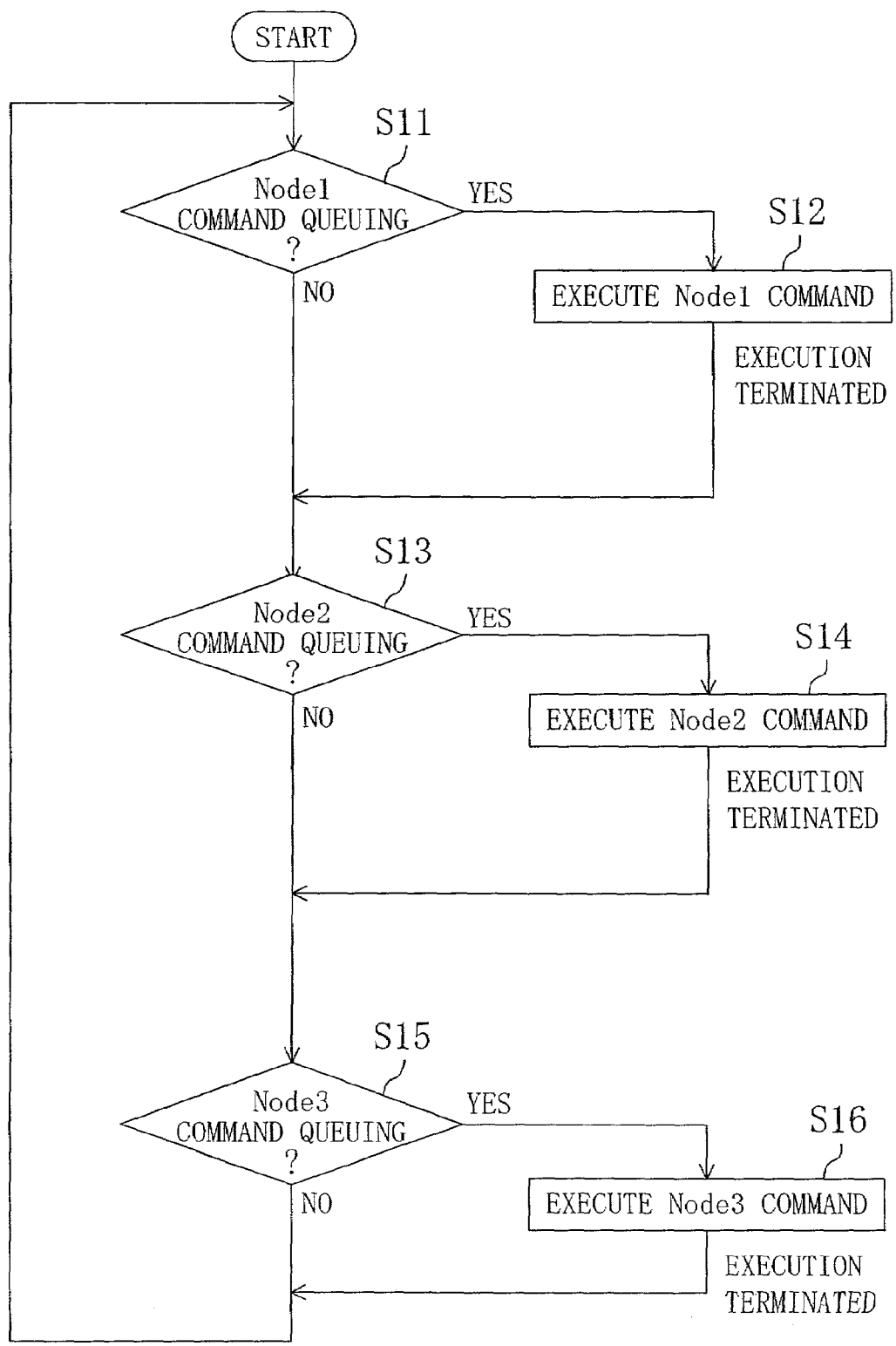
FIG. 6 is a flowchart of a sequence of command execution processing performed by the multi-control circuit shown in FIG. 2.

FIG. 6 is a flowchart of a sequence of command execution processing performed by the multi-control circuit 44 shown in FIG. 2. In the following description, note that the node numbers of the initiators 11, 12, and 13 are Node 1, Node 2, and Node 3, respectively. Note also that the initiators 11 to 13 intend to access the ORB_POINTER registers when they issue a command fetch request to the corresponding command control circuits 51 to 53.

First, in step S11, the multi-control circuit 44 determines whether or not a command processing sequence for the Node 1 initiator 11 is incomplete. In other words, the multi-control circuit 44 determines whether or not the command control circuit 51 has received a command fetch request and queued a pending command. If the command control circuit 51 has queued a command, the process proceeds to step S12, and otherwise, the process proceeds to step S13.

In step S12, the multi-control circuit 44 gives sequence execution permission to the command control circuit 51. The command control circuit 51 fetches a command from the Node 1 initiator 11 using the address to be command-fetched stored therein. That is, the command control circuit 51 notifies the packet processing circuit 45 of the address to be command-fetched. The packet processing circuit 45 generates a packet containing this address and transmits the packet to the initiator 11 via the link core circuit 42 and the bus 21. In response to this packet, the initiator 11 transmits a packet containing the command, which is transmitted via the bus 21, the link core circuit 42, and the packet processing circuit 45, to be stored in the command receive buffer 47. The CPU 31 executes the command contained in this packet. In this way, a series of transaction for fetching and executing a command is performed. Upon termination of the command, the process proceeds to step S13.

In step S13, the multi-control circuit 44 determines whether or not a command processing sequence for the Node 2 initiator 12 is incomplete. In other words, the multi-control circuit 44 determines whether or not the command control circuit 52 has received a command fetch request and queued a pending command. If the command control circuit 52 has queued a command, the process proceeds to step S14, and otherwise, the process proceeds to step S15.

In step S14, the multi-control circuit 44 gives sequence execution permission to the command control circuit 52. As in step S12, the command control circuit 52 fetches a command from the Node 2 initiator 12. The CPU 31 executes the command, and upon termination of the command, the process proceeds to step S15.

In step S15, the multi-control circuit 44 determines whether or not a command processing sequence for the Node 3 initiator 13 is incomplete. In other words, the multi-control circuit 44 determines whether or not the command control circuit 53 has received a command fetch request and queued a pending command. If the command control circuit 52 has queued a command, the process proceeds to step S16, and otherwise, the process returns to step S11.

In step S16, the multi-control circuit 44 gives sequence execution permission to the command control circuit 53. As in step S12, the command control circuit 53 fetches a command from the Node 3 initiator 13. The CPU 31 executes the command, and upon termination of the command, the process returns to step S11. Thereafter, substantially the same sequence is repeated.

As described above, the multi-control circuit 44 constantly manages the state of command execution by the connected initiator, and makes a determination whether or not command execution permission should be given for all the initiators equally in order. This prevents occurrence of variation in the frequency of command execution among the initiators.

Substantially the same sequence as that described above is followed when the initiators 11 to 13 intend to access the respective DOORBELL registers in their command fetch request, except that the operation of fetching a command from the initiators 11 to 13 is more complicated. Specifically, the following operation is performed in place of step S12 for the initiator 11.

The command control circuit 51 transmits the address stored in the ORB_POINTER register R13 to the initiator 11. In response to this transmission, the initiator 11 transmits a packet containing a pointer indicating an ORB to be referred to next time. The command control circuit 51 notifies the packet processing circuit 45 of this pointer. The packet processing circuit 45 generates a packet containing this pointer and transmits the packet to the initiator 11. In response to this packet, the initiator 11 transmits a packet containing the command. The CPU 31 executes the command contained in this packet. Substantially the same operation is also performed for the initiators 12 and 13, in place of steps S14 and S16, respectively.

Although the case of connecting three initiators was described above, the number of initiators is not limited to three. Substantially the same processing can be performed for up to 63 initiators, the maximum number connectable to one local bus according to the IEEE 1394 standard, by providing a command control circuit corresponding to each initiator.

Figure 7A:
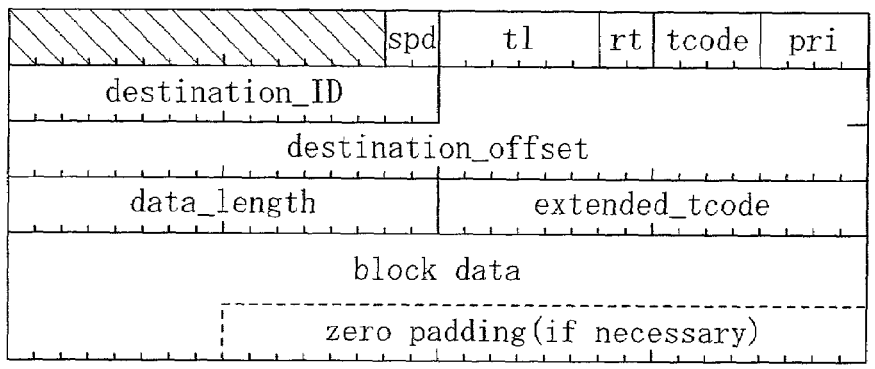
FIG. 7A is an illustration of a format of a BWRQ packet used inside the multi-initiator control unit of FIG. 2.
Figure 7B:
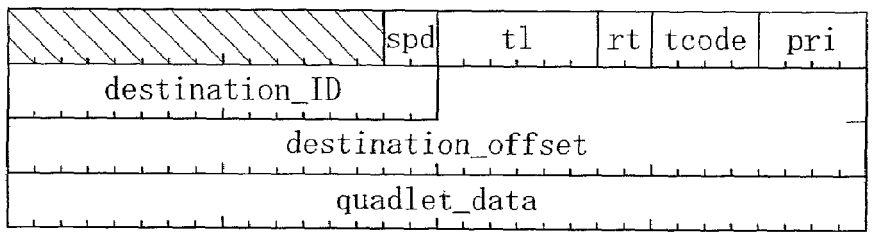
FIG. 7B is an illustration of a format of a QWRQ packet used inside the multi-initiator control unit of FIG. 2.
Figure 7C:
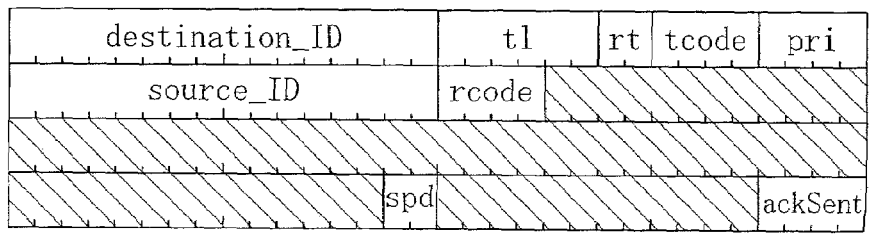
FIG. 7C is an illustration of a format of a WRS packet used inside the multi-initiator control unit of FIG. 2.
Figure 7D:
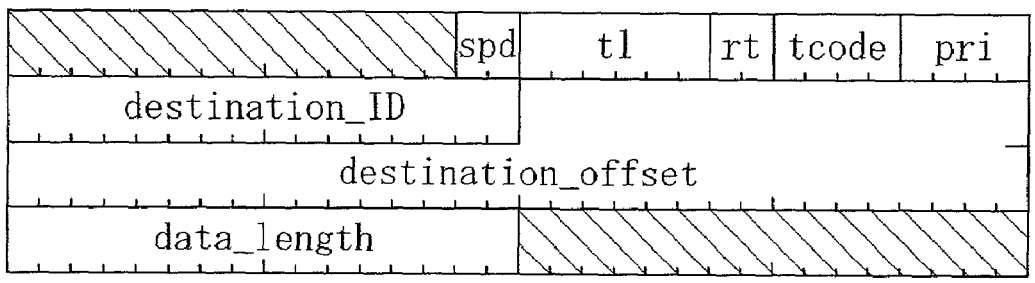
FIG. 7D is an illustration of a format of a BRRQ packet used inside the multi-initiator control unit of FIG. 2.
Figure 7E:
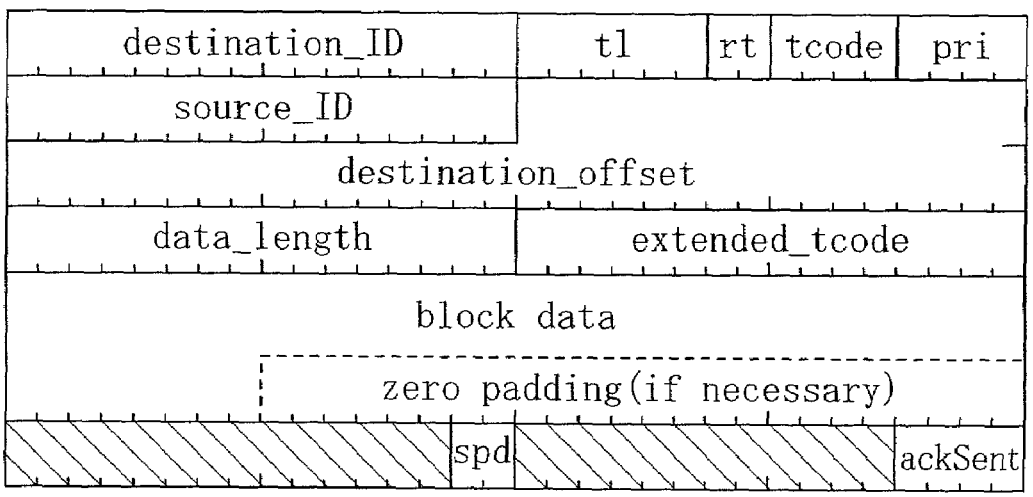
FIG. 7E is an illustration of a format of a BRRS packet used inside the multi-initiator control unit of FIG. 2.
Figure 8A:
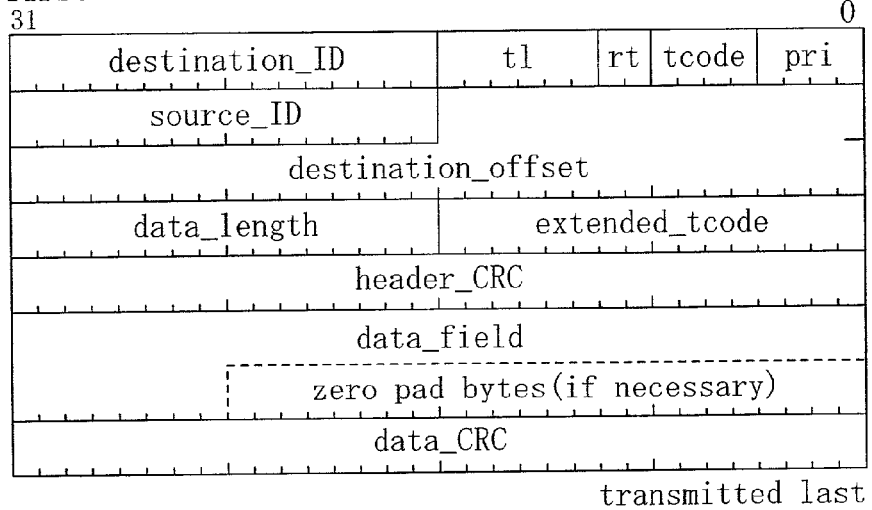
FIG. 8A is an illustration of a format of a BWRQ packet on an IEEE 1394 bus.
Figure 8B:
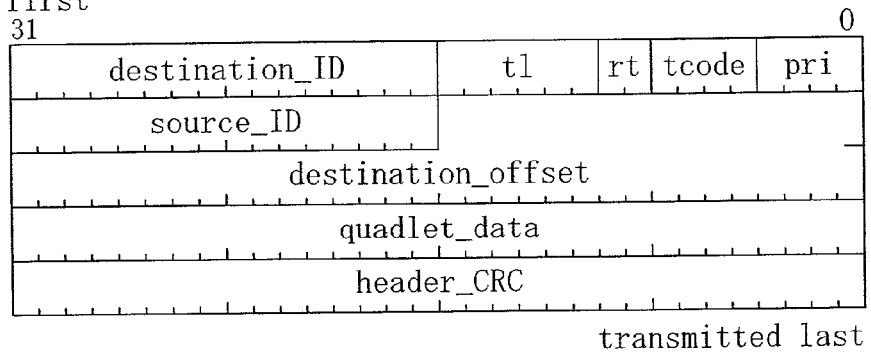
FIG. 8B is an illustration of a format of a QWRQ packet on the IEEE 1394 bus.
Figure 8C:
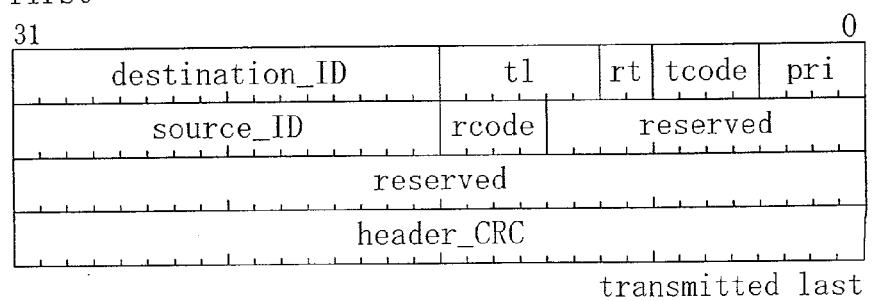
FIG. 8C is an illustration of a format of a WRS packet on the IEEE 1394 bus.
Figure 8D:
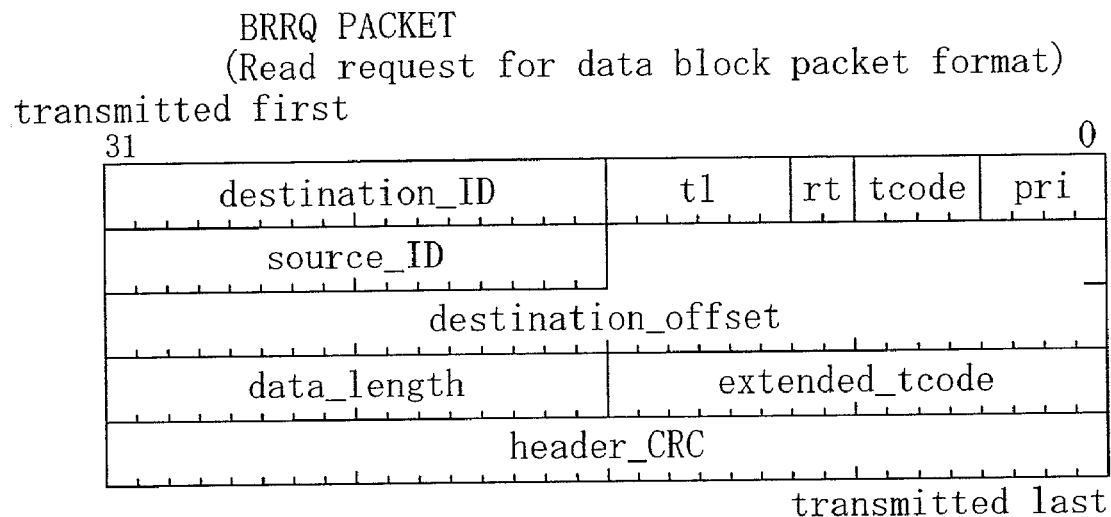
FIG. 8D is an illustration of a format of a BRRQ packet on the IEEE 1394 bus.
Figure 8E:
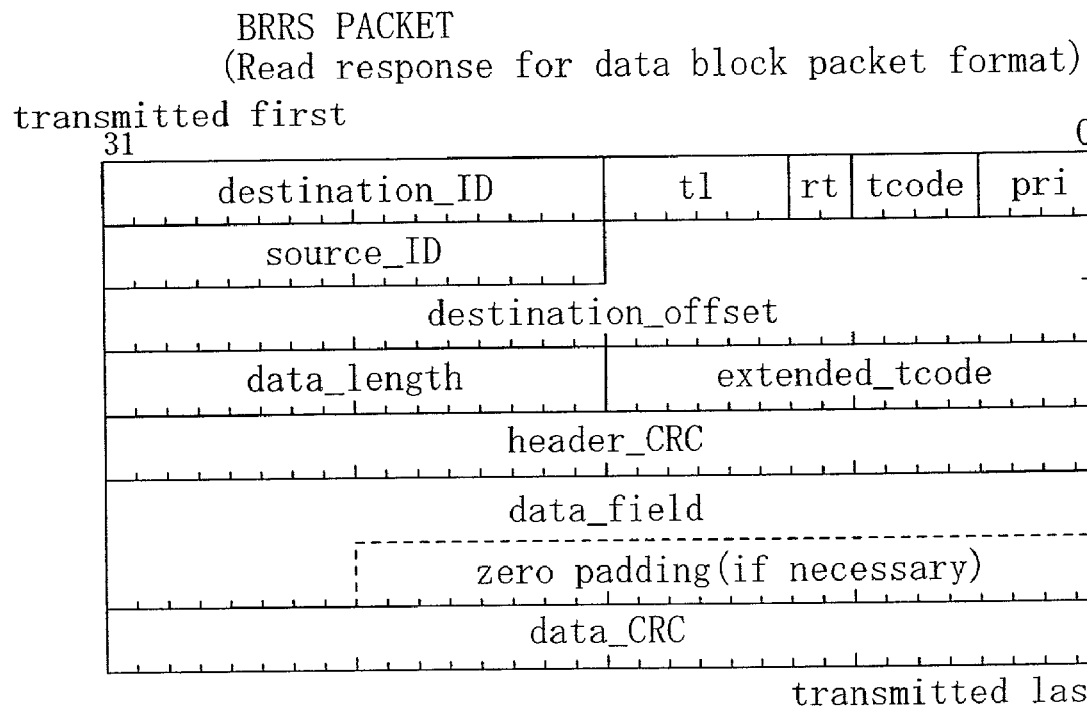
FIG. 8E is an illustration of a format of a BRRS packet on the IEEE 1394 bus.

FIGS. 7A to 7E illustrate formats of packets used internally by the multi-initiator control unit 2 of FIG. 2. The hatched portions in FIGS. 7A to 7E represent reserved fields. Specifically, FIG. 7A illustrates a format of a BWRQ (block write request) packet, FIG. 7B a format of a QWRQ (quadlet write request) packet, FIG. 7C a format of a WRS (write response) packet, FIG. 7D a format of a BRRQ (block read request) packet, and FIG. 7E a format of a BRRS (block read response) packet.

FIGS. 8A to 8E illustrate formats of packets on the IEEE 1394 buses 21 to 23. FIGS. 8A to 8E correspond to the formats of FIGS. 7A to 7E, respectively.

When a packet is to be transmitted to any of the buses 21 to 23, the link core circuit 42 receives the packet in any of the formats of FIGS. 7A to 7E and generates a cyclic redundancy check (CRC) code such as header_CRC or data_CRC based on the received packet. The link core circuit 42 then adds a field of the CRC code to the received packet, and outputs the resultant packet in any of the formats FIGS. 8A to 8E to the physical layer controller 41.

When a packet is to be received from any of the buses 21 to 23, the link core circuit 42 receives the packet in any of the formats of FIGS. 8A to 8E and performs error detection by CRC by referring to a header_CRC or data_CRC region of the received packet. The link core circuit 42 then outputs the error-detected packet in any of the formats FIGS. 7A to 7E to the packet filter 43 and the packet processing circuit 45.

Figure 9:
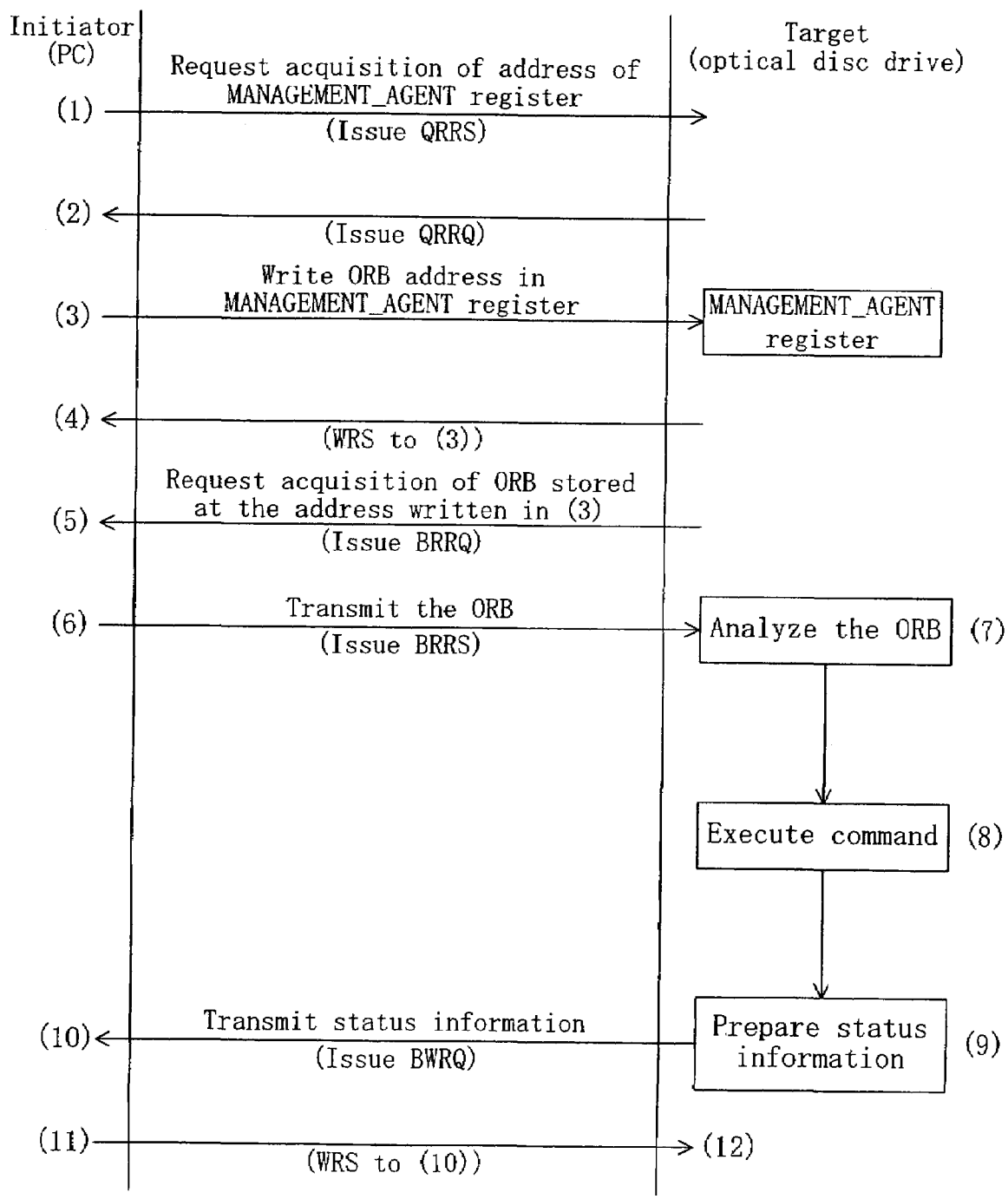
FIG. 9 is an illustration of a command processing sequence for executing LOGIN command.

Hereinafter, the operation of the multi-initiator control unit 2 of FIG. 2 will be described. First, execution of LOGIN command will be described. The multi-initiator control unit 2 performs the command processing sequence shown in FIG. 9 for the initiator 11. Once the command processing sequence for LOGIN command for the initiator 11 is terminated, the CPU 31 enables one bit in the control register 48 corresponding to the node number of the LOGIN initiator 11. Likewise, the LOGIN processing for the initiators 12 and 13 is performed. By the series of LOGIN processing, the command control circuits 51, 52, and 53 are assigned to the initiators 11, 12, and 13, respectively.

Figure 10:
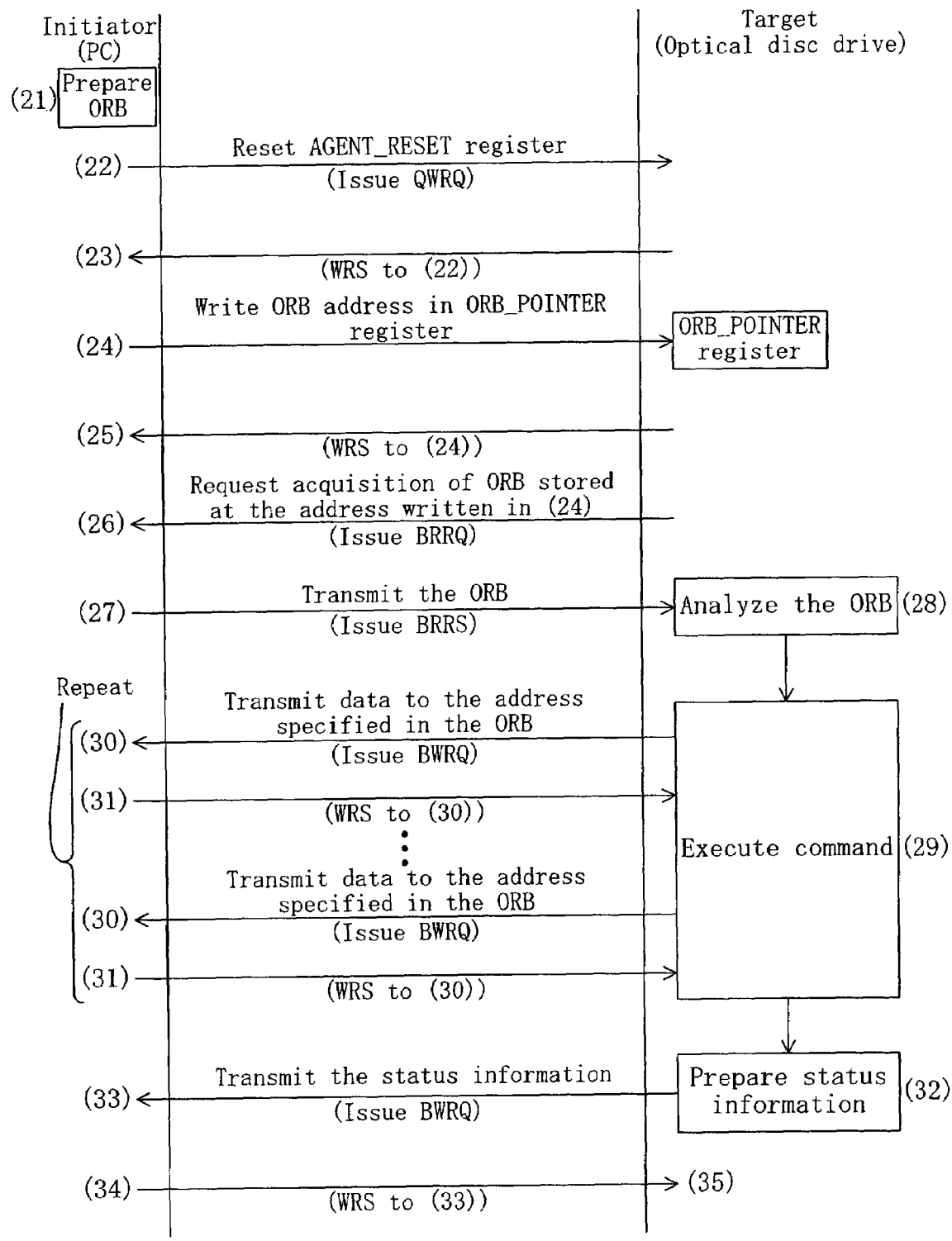
FIG. 10 is an illustration of a command processing sequence for executing READ command.
Figure 11:
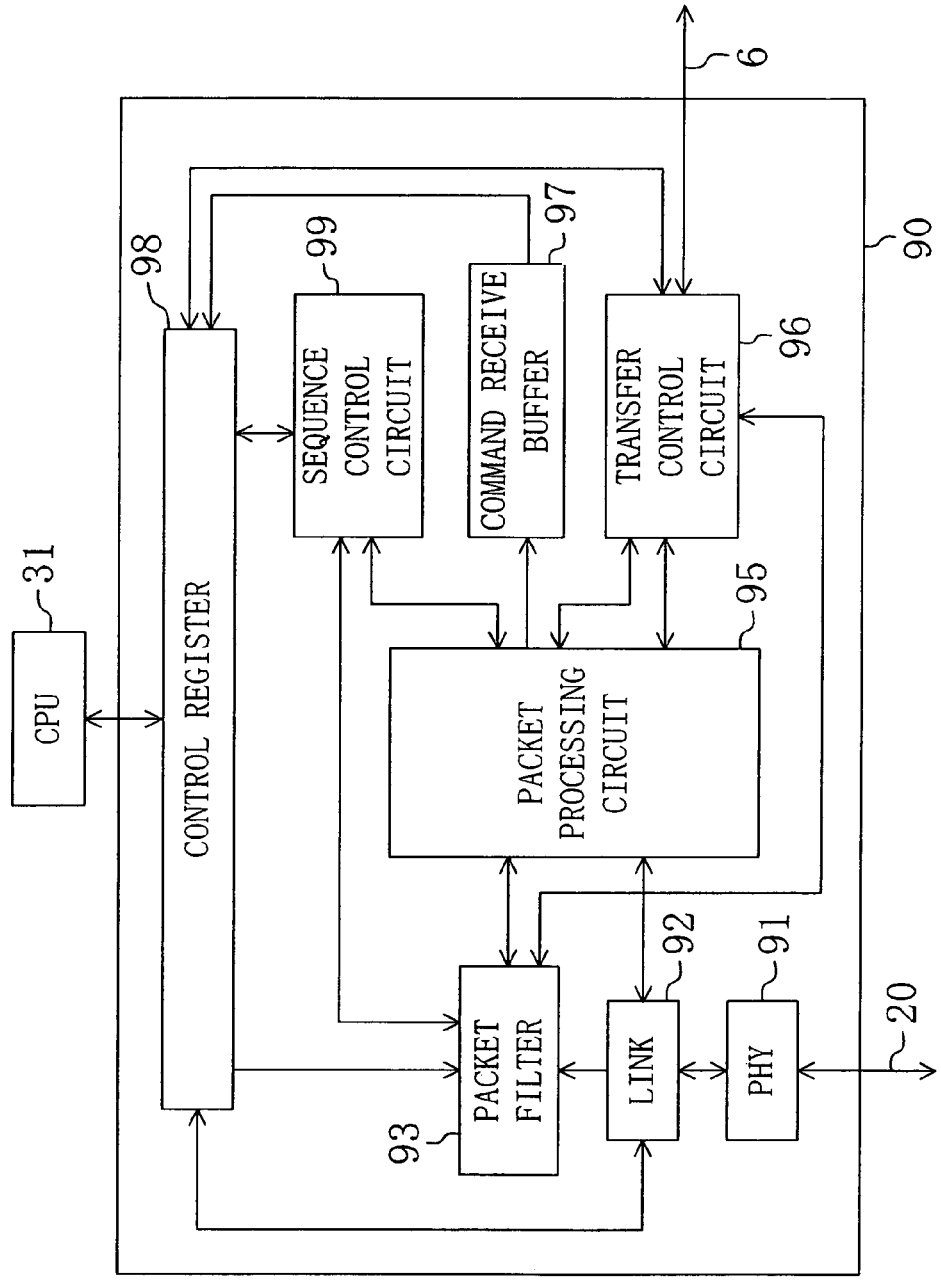
FIG. 11 is a block diagram of a conventional sequence processor.

Next, execution of READ command will be described. The command processing sequence between the multi-initiator control unit 2 and the initiators 11 to 13 is substantially the same as that shown in FIG. 10, except that the command control circuits 51 to 53 can queue a command.

The initiator 11 transmits a QWRQ packet to the AGENT_RESET register R12 for executing READ command. The initiator 11 then transmits a BWRQ packet to the corresponding command control circuit 51, writing the address of an ORB to be accessed by the command control circuit 51 in the ORB_POINTER register R13. The multi-control circuit 44 manages the state of each of the command control circuits 51 to 53. When the multi-control circuit 44 gives sequence execution permission to the command control circuit 51, for example, the command control circuit 51 executes command fetch operation.

The command receive buffer 47 stores the command-containing packet received from the initiator 11. The CPU 31 reads the command from the command receive buffer 47, and activates the transfer control circuit 46 for execution of the READ command. The transfer control circuit 46 reads data in the DVD-RAM disc 5 from the DVD-RAM controller 3 via the DMA bus 6, and outputs the read data to the packet processing circuit 45. The packet processing circuit 45 prepares a packet containing the input data and outputs the packet to the link core circuit 42.

Assume that during the execution of the data transfer sequence for the initiator 11, the multi-initiator control unit 2 receives a command fetch request packet for WRITE command from the initiator 12 and a command fetch request packet for READ command from the initiator 13. In this case, the command control circuit 52 corresponding to the initiator 12 receives the command fetch request from the initiator 12 even during the execution of the data transfer sequence. That is, the command control circuit 52 stores an address to be accessed for command fetch operation according to the control signal from the multi-control circuit 44, and waits for sequence execution permission. Likewise, the command control circuit 53 corresponding to the initiator 13 receives the command fetch request from the initiator 13 even during the execution of the data transfer sequence, and waits for sequence execution permission.

Upon termination of the data transfer sequence for the initiator 11, the multi-control circuit 44 examines the command queuing state of the command control circuit 52, that is, whether or not the command control circuit 52 has received a command fetch request. If recognizing that the command control circuit 52 has queued a command, the multi-control circuit 44 gives sequence execution permission to the command control circuit 52. Upon receipt of sequence execution permission, the command control circuit 52 executes the command processing sequence for the initiator 12. The packet processing circuit 45 sends a received packet to the command receive buffer 47 to be stored therein.

The CPU 31 reads the command from the command receive buffer 47, and activates the transfer control circuit 46 for execution of the WRITE command. The transfer control circuit 46 transfers a packet to the link core circuit 42 for reading data from the initiator 12. The transfer control circuit 46 reads data from the initiator 12 via the link core circuit 42, and writes the data in the DVD-RAM disc 5 via the DMA bus 6 and the DVD-RAM controller 3. Once a specified amount of transfer data has been written in the DVD-RAM disc 5, the transfer control circuit 46 transmits status information to the initiator 12. In this way, this data transfer processing sequence is terminated.

Upon termination of the command processing sequence for the initiator 12, the multi-control circuit 44 examines the command queuing state of the command control circuit 53. If recognizing that the command control circuit 53 has queued a command, the multi-control circuit 44 gives sequence execution permission to the command control circuit 53. Upon receipt of sequence execution permission, the command control circuit 53 executes command fetch operation for the initiator 13, and a received packet is stored in the command receive buffer 47. Thereafter, as described above, the CPU 31 activates the transfer control circuit 46 and executes the READ command.

As described above, in the multi-initiator control unit 2 of this embodiment, the command control circuits 51, 52, and 53 perform a command processing sequence for the corresponding initiators. The multi-control circuit 44 controls the command control circuits 51, 52, and 53 to enable a processing sequence for a plurality of initiators. Therefore, the CPU 31 is relieved of performing a command processing sequence such as command fetch operation. In addition, while the CPU 31 executes a command stored in the command receive buffer 47, a data transfer processing sequence is performed by the transfer control circuit 46. This permits efficient sequence control and data transfer control, enabling management of a plurality of initiators without increasing the load on the CPU 31.

(Modifications)

The CPU 31, in place of the multi-control circuit 44, may give sequence execution permission to the command control circuits 51 to 53 via the control register 48, to control the timing at which a command is fetched. This modification will be described.

A data transfer processing sequence performed by the transfer control circuit 46, for example, can be basically implemented by only hardware. However, the processing of a command received from the initiator may fail to be implemented by only hardware and require firmware. Also, an error may be generated in transferring data during a data transfer processing sequence. To solve this problem, processing by firmware may be necessary.

In the above case, the processing by firmware executed by the CPU 31 may fail to catch up with the processing by hardware. In such a case, it is necessary for the CPU 31 to control the command processing sequence.

This modification will be described with reference to FIGS. 2 and 3. Assume that the processing of LOGIN command for the initiators 11 and 12 has been terminated. The initiator 11 transmits a BWRQ packet to the ORB_POINTER register R13 of the command control circuit 51. Once the multi-control circuit 44 gives sequence execution permission to the command control circuit 51 corresponding to the initiator 11, the command control circuit 51 performs command fetch operation for the initiator 11. The packet processing circuit 45 sends a packet received from the initiator 11 to the command receive buffer 47 to be stored therein. The CPU 31 reads a command stored in the command receive buffer 47 and executes the command. Assume that this command requires processing by firmware.

The CPU 31 controls the command control circuit 52 to be in the state of waiting for sequence execution permission via the control register 48. An address to be command-fetched for READ command, for example, transmitted from the initiator 12 during the execution of the command from the initiator 11 by the CPU 31 is stored in the command control circuit 52.

Once the CPU 31 terminates the command processing for the initiator 11, it gives sequence execution permission to the multi-control circuit 44, which in turn gives sequence execution permission to the command control circuit 52. Upon receipt of sequence execution permission, the command control circuit 52 fetches the command from the initiator 12. The packet processing circuit 45 sends a packet from the initiator 12 to the command receive buffer 47 to be stored therein. The CPU 31 reads the command stored in the command receive buffer 47 and executes the command from the initiator 12.

As described above, in this modification, the CPU 31 can freely control the start timing of a command processing sequence, and thus it is possible to synchronize the command processing sequence with the operation of the CPU 31. This facilitates sequence management by the CPU 31.

In the embodiment described above, data transfer between an initiator and a DVD-RAM disc was exemplified. The present invention is also applicable to data transfer between an initiator and another data recording medium such as another type of optical disc and a magnetic disc.

According to the present invention, the load on the CPU is prevented from increasing even when a plurality of initiators are connected. Thus, it is possible to provide a multi-initiator control unit and method capable of connecting a plurality of initiators and yet performing high-speed data transfer.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A multi-initiator control unit for performing packet-unit communication with each of a plurality of devices connected via a transmission line, the multi-initiator control unit comprising:
   a link core circuit for transmitting a packet to be transmitted to the transmission line, and also receiving a packet from the transmission line, performing error detection, and outputting the error-detected packet;
   a packet filter for analyzing the packet received by the link core circuit and outputting the results;
   a plurality of command control circuits each for controlling a command processing sequence performed with the corresponding device;
   a multi-control circuit for giving sequence execution permission to one of the plurality of command control circuits;
   a packet processing circuit for generating a packet containing information output by the permission-given command control circuit as the packet to be transmitted and outputting the packet to the link core circuit for transmission, and also outputting the packet received and output by the link core circuit according to the analysis results output by the packet filter; and
   a CPU for executing a command contained in the packet output by the packet processing circuit,
   wherein each of the plurality of command control circuits stores information output by the corresponding device, the information being required for a command processing sequence performed with the corresponding device, and outputs the information once the sequence execution permission is given to the command control circuit,
   the multi-control circuit outputs information contained in the packet received and output by the link core circuit, the information being required for a command processing sequence performed with the sender device of the packet, to the command control circuit among the plurality of command control circuits corresponding to the sender device to be stored in the command control circuit, based on the output of the packet filter, and
   the packet processing circuit generates a packet containing information output by the command control circuit provided with the sequence execution permission and outputs the packet, and also receives a packet output by the device corresponding to the command control circuit in response to the packet output by the packet processing circuit.

2. A multi-initiator control unit for performing packet-unit communication with each of a plurality of devices connected via a transmission line, the multi-initiator control unit comprising:
- a link core circuit for transmitting a packet to be transmitted to the transmission line, and also receiving a packet from the transmission line, performing error detection, and outputting the error-detected packet;
- a packet filter for analyzing the packet received by the link core circuit and outputting the results;
- a plurality of command control circuits each for controlling a command processing sequence performed with the corresponding device;
- a multi-control circuit for giving sequence execution permission to one of the plurality of command control circuits;
- a packet processing circuit for generating a packet containing information output by the permission-given command control circuit as the packet to be transmitted and outputting the packet to the link core circuit for transmission, and also outputting the packet received and output by the link core circuit according to the analysis results output by the packet filter; and
- a CPU for executing a command contained in the packet output by the packet processing circuit, wherein each of the plurality of command control circuits has a register for storing an address for performing a command processing sequence, and an address of the register is obtained by performing address expansion on an address of the register of a reference command control circuit among the plurality of command control circuits by a predetermined value as a unit depending on the node number of the device corresponding to the command control circuit including the register in question.

* * * * *